(12) United States Patent
Tata et al.

(10) Patent No.: US 12,475,091 B1
(45) Date of Patent: Nov. 18, 2025

(54) COMPUTER-IMPLEMENTED METHOD, COMPUTER PROGRAM PRODUCT AND COMPUTER SYSTEM FOR MANAGING TRANSACTIONAL DATA

(71) Applicant: Accenture Global Solutions Limited, Dublin (IE)

(72) Inventors: Swati Tata, Bangalore (IN); Shama Firoz, Raichur (IN); Jandhyala Sree Kalyani, Hyderabad (IN); Venkatesh Nagilla, Hyderabad (IN); Ilesha Malhotra, Sugar Land, TX (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 18/819,923

(22) Filed: Aug. 29, 2024

(51) Int. Cl.
- *G06F 16/21* (2019.01)
- *G06F 16/215* (2019.01)
- *G06F 16/23* (2019.01)
- *G06F 16/28* (2019.01)

(52) U.S. Cl.
CPC ........ *G06F 16/215* (2019.01); *G06F 16/2365* (2019.01); *G06F 16/285* (2019.01)

(58) Field of Classification Search
CPC ... G06F 16/215; G06F 16/2365; G06F 16/285
See application file for complete search history.

(56) References Cited

U.S. PATENT DOCUMENTS

| | | | |
|---|---|---|---|
| 8,630,953 B1 * | 1/2014 | Youngberg | G06Q 20/4016 705/35 |
| 10,223,406 B2 | 3/2019 | Betz | |
| 2006/0169768 A1 * | 8/2006 | Gangi | G07F 7/12 235/380 |
| 2011/0236580 A1 * | 9/2011 | Winkler | G04D 3/0048 427/282 |

(Continued)

OTHER PUBLICATIONS

"Description of the database normalization basics," Microsoft 365 Apps/Microsoft Learn, Article Jun. 6, 2024, 6 pages, retrieved Sep. 30, 2024 [https://learn.microsoft.com/en-us/office/troubleshoot/access/database-normalization-description].

(Continued)

*Primary Examiner* — Kavita Stanley
*Assistant Examiner* — Cecile H Vo
(74) *Attorney, Agent, or Firm* — Polsinelli PC

(57) ABSTRACT

Methods, systems, and computer-readable storage media for classification and normalization of transactional data. Description for each name included in the transactional data is extracted. Words and a frequency of words in the description with respect to each of features pre-defined for the transactional data are identified. Based on weights of the words and features and feature encoding rules, the transactional data is classified and names from the transactional data are identified for normalization. Further, one or more of various types (type 1, 2, 3, and 4) of determinations are performed to determine whether the names identified to be normalized match with any of raw names present in a global table of a database. In response to positive results of any of (Continued)

the determinations, normalized names are extracted from the global table for the names. The global table includes a mapping of the raw names and associated normalized names.

18 Claims, 10 Drawing Sheets

(56) References Cited

U.S. PATENT DOCUMENTS

| | | | | |
|---|---|---|---|---|
| 2013/0132139 | A1* | 5/2013 | Yeung | G06F 16/951 |
| | | | | 705/7.11 |
| 2014/0181915 | A1* | 6/2014 | Su | H04L 63/08 |
| | | | | 726/4 |
| 2017/0351915 | A1* | 12/2017 | Thompson | G06V 30/413 |
| 2019/0147509 | A1* | 5/2019 | Mehta | H04L 67/10 |
| | | | | 705/7.39 |
| 2020/0210492 | A1* | 7/2020 | Chang | H04L 51/23 |
| 2020/0311798 | A1* | 10/2020 | Forsyth | G06Q 30/0643 |
| 2023/0004981 | A1* | 1/2023 | Lowenberg | H04L 63/102 |
| 2023/0143574 | A1* | 5/2023 | Hillman Beauchesne | |
| | | | | H04N 21/23418 |
| | | | | 382/103 |
| 2024/0202686 | A1* | 6/2024 | Creel | G06Q 40/02 |
| 2024/0211690 | A1 | 6/2024 | Faizakof et al. | |
| 2025/0094395 | A1* | 3/2025 | Hanson | G06F 16/254 |

OTHER PUBLICATIONS

Kotios, et al., "Deep learning enhancing banking services: a hybrid transaction classification and cash flow prediction approach," Journal of Big Data, 2022, vol. 9:100, 29 pages.

* cited by examiner

COMPUTER-IMPLEMENTED METHOD, COMPUTER PROGRAM PRODUCT AND COMPUTER SYSTEM FOR MANAGING TRANSACTIONAL DATA

FIELD OF THE INVENTION

Various embodiments described herein relate generally to computer-implemented method, computer system, and computer program product for managing transactional data.

BACKGROUND

Organizations/enterprises maintain an information system to manage transactional data. The transactional data includes records indicating transactions between suppliers and consumers for various products/services. The transactional data may include names, invoice description, commodity description, service description, material description, and/or the like. Examples of the names include supplier/vendor names, consumer/customer names, names of the products/services, and/or the like.

Further, computing devices generating the transactional data may be different from each other. Accordingly, the transactional data generated by these computing devices may have several different forms. For example, the names included in the transactional data are generated in several different ways due to inclusion or omission of legal form, different formatting, abbreviations, and spelling variations. Therefore, a name can have multiple forms/variants. However, such variations pose a challenge for a search engine/mining engine of the information system to identify the name or resolve the name against a database, as the database only includes the variants of the names in a subject form without providing any mapping data/explicitly labels for the variants of the name. Therefore, it is important to organize the transactional data prior to storing in the database.

Data categorization and data normalization helps in organizing the transactional data within the database, so that the organizations can utilize the organized transactional data for further queries and analysis without any challenges.

Various normalization methods are used to normalize the names received in the transactional data. In some examples, a normalization method involves performing a direct lookup on the database to match raw names for the received names and extracting normalized names for the received names based on the matched raw names. However, the raw names are successfully matched only if the received names are valid and do not include any keywords. Therefore, accuracy of the normalization is low.

Further, third party search engines are used to perform the direct lookup on the database. Therefore, the normalization method has high reliance on the third-party search engines. In addition, if the received raw names are not valid, the search engine does not provide any output or provides any false output. Due to which, submission of a number of queries for the search engine iteratively increases. However, in some examples, the search engine has limit on submissions, which limit the number of queries that can be submitted for the search engine. Therefore, the queries to the search engine exceeding the limit are blocked, which further delays the name normalization by reducing a number of names that can be normalized and increases resource consumption for the normalization.

SUMMARY

Implementations of the present disclosure are generally directed to enable faster and accurate categorization of transactional data and normalization of names included in the transactional data.

In general, innovative aspects of the subject matter described in this specification provide a method for normalizing a received name. The method includes maintaining a database of raw names and corresponding normalized names. The method includes first determining whether the received name matches any of the raw names of the database. In response to a negative result of the first determining, the method includes first preprocessing the received name to remove content found in a first list, resulting in a preprocessed name. Thereafter, the method includes second determining whether the preprocessed name matches any of the raw names of the database. In response to a negative result of the second determining, the method includes submitting the preprocessed name to a search engine. The method includes identifying from search results of the search engine, a searched name. Upon identifying the searched name, the method includes third determining whether the searched name matches any of the raw names of the database. In response to the positive results of the first determining, the second determining, or the third determining, one of the normalized names from the database based on any of the matches.

In response to a negative result of the third determining, the method includes second preprocessing at least some links from the search results to remove content from the links found in a second list. The method includes cross referencing results of the second preprocessing with a prior history of search engine results to generate a link name. The method includes fourth determining whether the link name matches any of the raw names of the database. In response to a positive result of the fourth determining, the method includes extracting one of the normalized names from the database based on a match identified in the fourth determining. In response to a negative result of the fourth determining, the method includes sending the received name for manual name normalization.

The present disclosure further describes a system for implementing the method provided herein. The present disclosure also describes computer-readable storage media coupled to one or more processors and having instructions stored thereon which, when executed by the one or more processors, cause the one or more processors to perform operations in accordance with the method described herein.

It is appreciated that methods in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE FIGURES

Various embodiments in accordance with the present disclosure will be described with reference to the drawings, in which.

Like reference numbers and designations in the various drawings indicate like elements.

DETAILED DESCRIPTION

Figure 1:
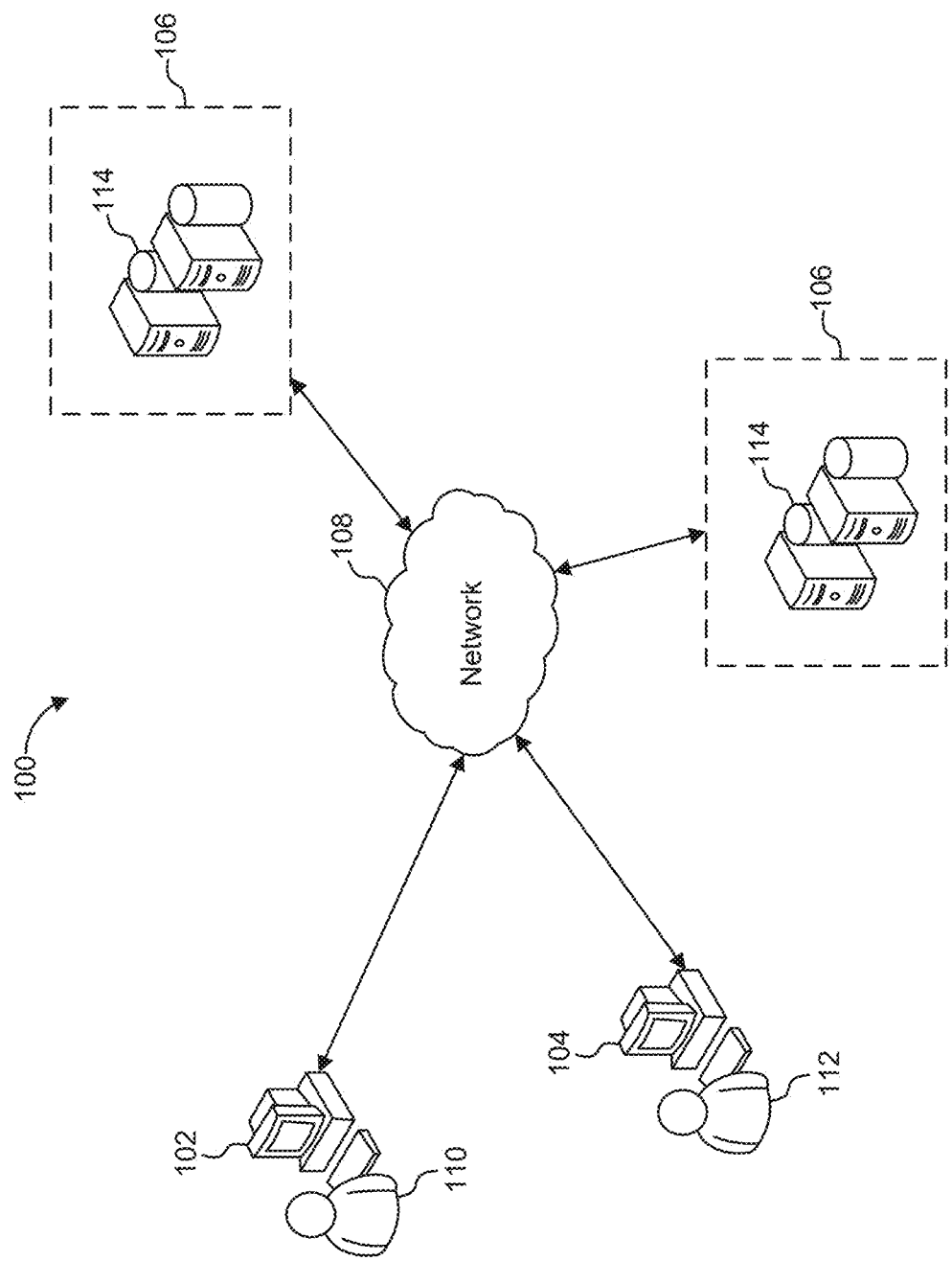
FIG. 1 depicts an example environment that may be used to execute implementations of the present disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" (e.g., "for example", "an example of", by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures, and techniques may be shown without unnecessary detail in order to avoid obscuring example embodiments.

The specification and drawings are to be regarded in an illustrative rather than a restrictive sense. It will, however, be evident that various modifications and changes may be made thereunto without departing from the broader spirit and scope of the invention as set forth in the claims.

Enterprises continuously seek to improve and gain efficiencies in their operations by managing transactional data. The transactional data refers to any data that is generated through interactions with an information system of an enterprise. The information system includes a database for storing the transactional data and a search/mining engine for accessing the stored transactional data from the database. The transactional data includes transactional lines, which represent different types of information such as names, invoice description, commodity description, material description, and/or the like. The names include supplier/vendor names, consumer/customer names, names of the products, and/or the like. Further, categorization and normalization of the transactional data aids in organizing the transactional data, while improving data processing operations of the enterprises. Further, normalization of the names included in the transactional data ensures that the names are similar across all records in the database. Also, the normalization of the names maintains data integrity and creates a single source of truth.

In some examples, categorization of the transactional data involves a manual process. However, such a manual process makes the categorization time consuming when it requires thousands or millions of the transactional lines to be categorized. For example, the manual process consumes about 3 days for categorizing 5 thousand (K)-6K lines only across a specific dimension (for example, a name, an invoice description, product/service description, or the like). Therefore, additional dimensions of the transactional lines make more time-consuming effecting the enterprise operations. Further, the manual process of categorization generates larger issues, as categorization knowledge of different individuals results in non-transparent and non-replicable categorization, thereby resulting in inaccurate categorization.

In some examples, the names of the transactional data are normalized using various normalization methods. However, such methods normalize the names with low accuracy, create a noise in the database and create an overhead on a search engine to match and resolve the names against the database. For example, a name from the transactional data is received and preprocessed by removing pre-defined content, while resulting in the preprocessed name. For the preprocessed name, an Application Programming Interface (API) entity search is initiated. The API entity search outputs a raw name from the database by matching the preprocessed name with raw names stored in the database. Upon obtaining the raw name for the preprocessed name, a normalized name associated with the obtained raw name is assigned for the preprocessed name. Thereby, assigning the normalized name for the received name. The normalized name is a standard/common name pre-defined for the respective raw name. However, the API entity search outputs the raw name for the preprocessed name only if the preprocessed name is valid and does not include any additional keywords. Otherwise, the API entity search outputs the preprocessed name itself as the raw name. Therefore, such a direct lookup performed on the database to output the raw name creates more noise/overhead on the search engine. In addition, in some examples, the preprocessing involves removing valid information from the received name. In such a scenario, the API entity search does not provide any output, therefore resulting in inaccurate normalization, while increasing time consumption and cost.

In some examples, Machine Learning (ML) models or Artificial Intelligence (AI) models are used for categorization and normalization of the transactional data. The ML or AI models may automate the process of categorization and normalization. However, training of such models for accurate categorization and normalization requires in-depth knowledge of specific data set. The specific data set are often related to a single organization/entity. Therefore, the ML or AI models used for categorization and normalization are not transferable to other organizations/enterprises. Further, the ML or AI models cannot be retrained based on their performance. Therefore, there is no learning/feedback loops for the ML or AI models from their previous operations.

In addition, inaccurate categorization and normalization of the transactional data results in unorganized record maintenance, inefficient storage, and/or the like, which further make it difficult to review and query the transactional data stored in the database.

In view of this, implementations of the present disclosure create an end-to-end orchestration process for enabling faster and accurate categorization of transactional data and normalization of the names in the transactional data. With such categorization and normalization, the transactional data is filtered/classified to establish a linkage between the received name and the normalized name of the organization/enterprise.

FIG. 1 depicts an example environment 100 that may be used to execute implementations of the present disclosure. In some examples, the example environment 100 manages transactional data of enterprise systems.

As depicted in FIG. 1, the example environment 100 includes computing devices 102 and 104, back-end systems 106, and a network 108. In some examples, the computing devices 102 and 104 are used by respective users 110 and 112 to log into and interact with computing platforms executing applications of the enterprise systems according to implementations of the present disclosure. The users 110 and 112 may be referred to suppliers/vendors/manufacturers/distributors, clients/customers/consumers, and/or the like, performing transactions with the enterprise systems for various products and/or services. Examples of the computing devices 102 and 104 may include desktop computing devices, smartphones, laptops, tablet, voice-enabled devices, and/or the like. It is contemplated that implementations of the present disclosure may be realized with any appropriate type of computing device. In some examples, each of the computing devices 102 and 104 may include a web browser application executed thereon, which may be used to display one or more web pages of a computing platform executing the applications. In some examples, each of the computing devices 102 and 104 may display one or more Graphical User Interfaces (GUIs) that enable the respective users 110 and 112 to interact with the computing platform.

In some examples, the network 108 may include a Local Area Network (LAN), a Wide Area Network (WAN), the Internet, or a combination thereof, and connects web sites, the computing devices 102 and 104, and the back-end systems 106. In some examples, the network 108 may be accessed over a wired and/or a wireless communication link. For example, a computing device like smartphone may utilize a cellular network to access the network 108.

In some examples, one or more of the back-end systems 106 may be implemented as an on-premises system that is operated by an enterprise or a third-party engaged in cross-platform interactions and data management. In some examples, the back-end systems 106 may be implemented as an off-premises system (for example, cloud or on-demand) that is operated by an enterprise or a third-party on behalf of an enterprise. In some examples, the back-end systems 106 may be implemented in a cloud environment. For simplicity, the back-end systems 106 depicted in FIG. 1 may be a cloud environment that is intended to represent various forms of servers including a web server, an application server, a proxy server, a network server, a server pool, and/or the like.

In some examples, each of the back-end systems 106 includes one or more transactional data management systems 114. A transactional data management system 114 may host components and the applications of the enterprise systems. Also, the transactional data management system 114 receives transactional data from the computing devices 102 and 104 over the network 108. In some examples, the transactional data may be generated by the applications (of the enterprise systems) executing on the computing devices 102 and 104. The transactional data includes one or more transactional lines. In some examples, the transactional lines represent various information of an enterprise system such as names, description, invoice information related to the transactions, time stamp associated with the invoice, and/or the like. Examples of the names include, but are not limited to, usernames (collectively referred to supplier names, consumer names, or the like), names of the products and/or the services, and so on. The description may include, for example, commodity description, material description, service description, description of supplier/consumer, or the like.

According to implementation of the present disclosure, the transactional data management system 114 classifies the transactional data/lines associated with each name into one or more categories with high accuracy. The categorizes may be used to support Source-to-Contract (S2C) category planning and Procure-to-Pay (P2P) analytics. The S2C category planning and the P2P analytics may involve automating procurement processes of the enterprise system.

Also, the transactional data management system 114 normalizes the names included in the transactional data. The normalization of the names reduces redundancy of the names by organizing the names into a standard format, eliminating duplicate names, and minimizing accuracy errors.

Various examples depicting categorization and normalization of the transactional data are described in detail in conjunctions with figures below.

Figure 2:
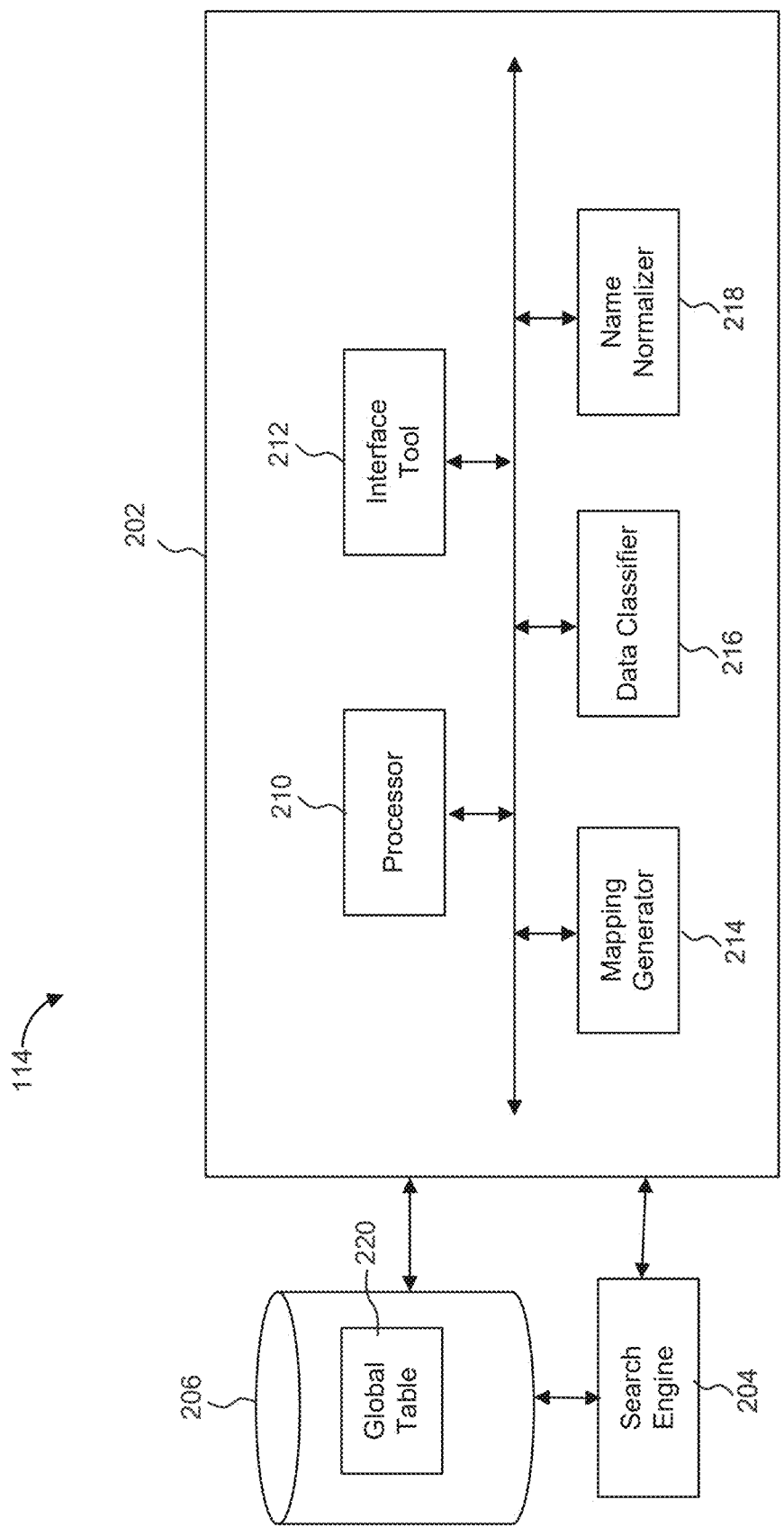
FIG. 2 depicts an example architecture of a transactional data management system for managing transactional data in accordance with implementations of the present disclosure.

FIG. 2 depicts an example architecture of the transactional data management system 114 for managing the transactional data in accordance with implementations of the present disclosure. The transactional data management system 114 includes a data management engine 202, a search engine 204, and a database 206. The data management engine 202 may be coupled with the search engine 204 and the database 206. The data management engine 202 may communicate with the search engine 204 to query the database 206.

The data management includes one or more processors 210, an interface tool 212, a mapping generator 214, a data classifier 216, and a name normalizer 218.

In some examples, the processor 210 may include microprocessors, microcomputers, microcontrollers, digital signal processors, central processing units, state machines, logic circuits, and/or any devices that manipulate data or signals based on operational instructions. Among other capabilities, the processor may fetch and execute computer-readable instructions in a memory operationally coupled with the processor. The processor 210 may be coupled with all the components 212-218 of the transactional data management system 114. Also, the processor 210 may be adapted for controlling all the components 212-218 of the transactional data management system 114.

In some examples, the interface tool 212 represents one or more front-end components/interfaces configured to receive raw data from various data sources of the enterprise system. The raw data may include raw names, metadata for the raw names, and/or the like. The raw names may indicate names of the users with which the transactions have been initiated for the products and/or services. It should be noted that suppliers, vendors, distributors, manufacturers, clients, consumers, customers, and/or the like are collectively referred to as users. The users may include organizations/enterprises or individuals. It should also be noted that the names in the transactional data may also include names of the products and/or services.

In some examples, the raw names include variations/different forms of a single name. For example, the raw names may include "ABC", "ABC Ltd", and "ABC outsourcing". All these raw names may be associated with a single user. The raw names may be stored in the database 206 (not shown).

The mapping generator 214 accesses the raw names from the database 206 and generates a global table 220. The global table 220 may be generated by mapping the accessed raw names with normalized names. The normalized names are pre-defined standard/common names defined for all the raw names (i.e., for all the variations/forms of the single name). For example, the normalized name may include "ABC" for the raw names "ABC", "ABC Ltd", and "ABC outsourcing". The mapping generator 214 stores and maintains the global table 220 in the database 206. The mapping generator 214 for generating the global table 220 is descried in detail in conjunction with FIGS. 3, and 4A-4C.

In some examples, the interface tool 212 represents one or more front-end components/interfaces executing the applications on the computing devices 102 and 104 to enable receipt of the transactional data. The transactional data may include transactional lines depicting information such as names of the users, description for the users (type of products/services associated with the users, or the like), invoices generated for transactions with the users, and/or the like. The received transactional data may be provided to the data classifier 216.

The data classifier 216 classifies the transactional data/lines associated with each name into one or more categories and derives the names of the users from the transactional data. The data classifier 216 may use a classification model (as described in FIG. 5) for classifying the transactional data into the one or more categories and for deriving the names from the transactional data. In some examples, the classification model may include one or more models such as foundation models/Large Language Models (LLMs), Machine Learning (ML) models, Artificial Intelligence (AI) models, and/or the like. In some implementations, the classification model may be retrained based on its previous outputs. Therefore, scalability and learning capabilities of the classification model may be improved.

For classification of the transactional data and derivation of the names, the data classifier 216 may provide inputs to the classification model for processing and obtains outputs from the classification model in accordance with the processing of the inputs. The inputs may include description associated with each of the names, features/dimensions that have been predefined for the names, weightage of the features, weightage of each word in the description, feature encoding rules, and/or the like. The output obtained from the classification model may indicate the categories for the transactional data and the names derived from the transactional data. The data classifier 216 for classification of the transactional data and derivation of the names is described in detail in conjunction with FIG. 5.

The name normalizer 218 extracts the normalized names for the names derived from the transactional data. In accordance with implementations of the present disclosure, the name normalizer 218 identifies the normalized names for the names by performing different stages of determination. For example, the name normalizer 218 may perform four types of determinations (a type-1 determination/first determining, a type-2 determination/second determining, a type-3 determination/third determining, and a type-4 determination/fourth determining) to extract the normalized names for the names. The four types of determination may be performed using the global table 220 stored in the database 206. The name normalizer 218 for normalizing the names is described in detail in conjunction with FIG. 6.

Therefore, with the proposed classification and normalization of the transactional data, the transactional data management system 114 efficiently processes a huge number (for example, million and billion) of the transactional lines/data within a less interval of time period, which further resulting in significantly improved performance.

Figure 3:
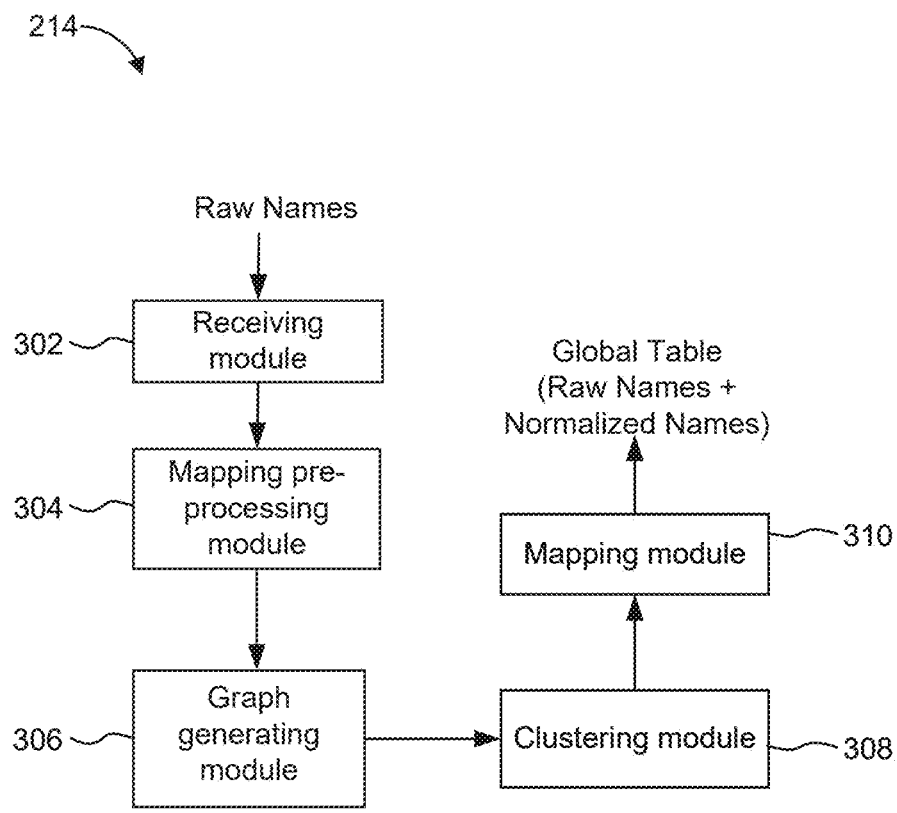
FIG. 3 is a block diagram that presents an example of a mapping generator for generating and maintaining a global table in a database in accordance with implementations of the present disclosure.

FIG. 3 is a block diagram that presents an example of the mapping generator 214 for generating and maintaining the global table 220 in the database 206 in accordance with implementations of the present disclosure. The global table 220 includes a mapping of raw names and associated normalized names.

The mapping generator 214 includes a receiving module 302, a mapping pre-processing module 304, a graph generating module 306, a clustering module 308, and a mapping module 310.

The receiving module 302 receives the raw names. The raw names may be received from different data sources of the enterprise systems and stored in the database 206. The raw names may include all the variations/forms of the name associated with a single user.

The mapping pre-processing module 304 pre-processes the received raw names to generate preprocessed raw names. The pre-processing of the raw names may involve removing one or more contents from the raw names, adding one or more contents to the raw names, converting one or more contents in the raw names from one form to another form (for example, converting "and" to "&"), concatenating/joining one or more contents (for example, joining single letters) in the raw names, replacing one or more contents with another contents in the raw names (for example, replacing accented characters), and preprocessing/post processing one or more contents in the raw names, while ensuring one or more contents to be retained in the raw names and enhancing a count of banned words. The banned words may correspond to words that have not to be considered for extracting links and/or attributes for the raw names. The links and/or the attributes extracted for the raw names may include title, description, and/or the like. For an example raw name "ABC mission leadership", the following links can be extracted: "https://www.ABCmission.org/about"; "https://www.ABCmissionleadership.org/"; and "https://ABCmissionleadership.com/".

In some examples, the contents to be removed from the raw names may include, but are not limited to, lowercase letters, vendor stop words (for example, llc, pvt, ltd, and so forth), values within brackets, country alpha-2 codes, generic keywords, multiple and trailing spaces, custom vendor keywords, last numeric values, country names after a third word, invalid alphanumeric words (for example, "abc 19087 768f"), duplicate words, banned links, and so on. In some examples, the contents to be added to the raw names may include banned words, banned links, and/or the like. Therefore, such contents may not be used to extract the link. In some examples, the one or more contents to be retained in the raw names may include country alpha-3 codes, country names, subdivision names, geographical names, numeric values, and/or the like. In some example, preprocessing/post processing the contents may include preprocessing/post processing abbreviation, word segmentation, and/or the like.

Upon preprocessing the raw names, the graph generating module 306 generates a graph and associated subcomponents for the preprocessed raw names. For generating the graph and the associated subcomponents, the graph generating module 306 may obtain the links for the preprocessed raw names, generate an embedding array for the preprocessed raw names based on the links and obtain Identifiers (IDs) associated with the preprocessed raw names. In an example, the IDs depict IDs of the users associated with the respective preprocessed raw names. Based on the links, the embedding array, and the IDs associated with the raw names, the graph generating module 306 may generate the graph and the associated subcomponents for the preprocessed raw names, as depicted in detail along with FIG. 4A.

Figure 4A:
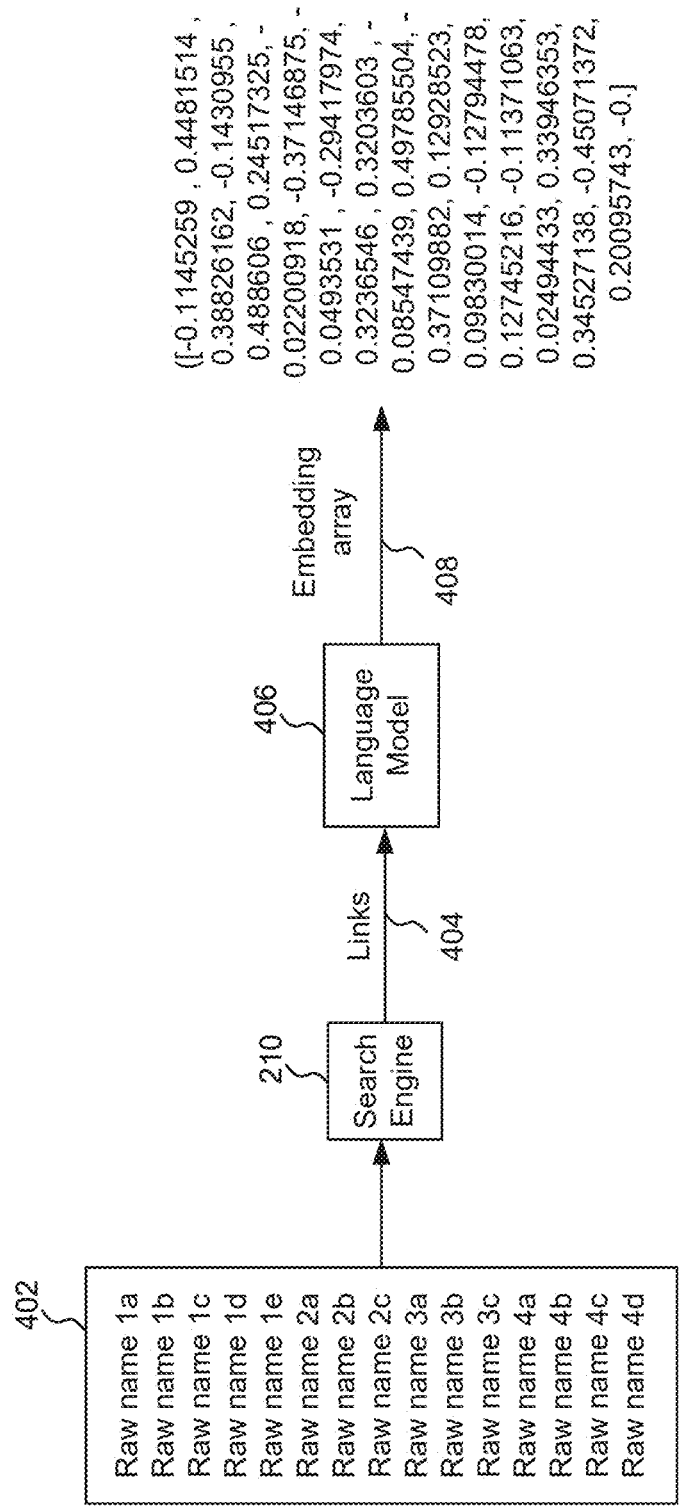
FIGS. 4A, 4B, and 4C depict an example process flow of generating the global table in accordance with implementations of the present disclosure.

As depicted in FIG. 4A, the graph generating module 306 may send the preprocessed raw names 402 to the search engine 204 through a custom search Application Programming Interface (API). In response to the sent preprocessed raw names, the graph generating module 306 receives the links 404 for the preprocessed raw names from the search engine 204. The graph generating module 306 may receive top K links (for example, 4 links) including names/keywords matching the preprocessed raw names and information associated with the names (for example, industry type, products/service, service area, and/or the like). In an example, for a preprocessed raw name "ABC", the graph generating module 306 may receive the links including the names such as "ABC", "ABC-Country A", "ABC", and "ABC-1". In another example, for a preprocessed name "DEF", the graph generating module 306 may receive the links including the names such as "DEF", "DEF", "DEF Logistics", "DEF Limited", and "DEF Data".

After receiving the links, the graph generating module 306 may use a language model 406 to generate embeddings for the links and the embedding array for the links. In some examples, the language model 406 may include a foundation model/LLM, a ML model, an AI model, and/or the like. The embedding array may be generated using for example, but not limited to, a cosine similarity as known in the art and further not described in detail herein. For example, the embedding array may be generated as:

Embedding array=cosine_similarity (current_embedding.reshape (−1, 1), previous_embedding.reshape (−1, 1)) [0][0]>=threshold Once the embedding array is generated, the graph generating module 306 may create an overall/flat embedding array 408 as:

Overall_embedding=np. sum (embedding_array, axis=0)
Name.embedding=overall_embedding.flatten( )np.linalg.norm(Overall_embedding, ord=2)

wherein, "np. sum (embedding_array, axis=0)" indicates a summing of all the embeddings in the embedding array along the specified axis (for example herein, axis=0). The "Name.embedding" may be computed by normalizing the overall_embedding. Normalizing the overall_embedding may involve flattening the summed embeddings and dividing by a L2 norm (Eulciden norm) of the overall_embedding.

Figure 4B:
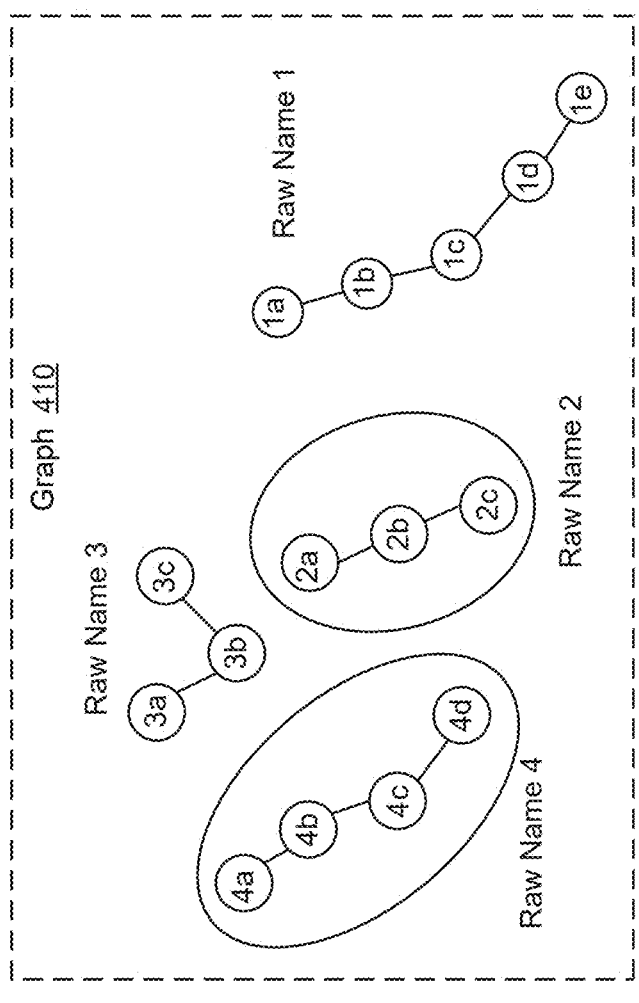
Figure 4B:
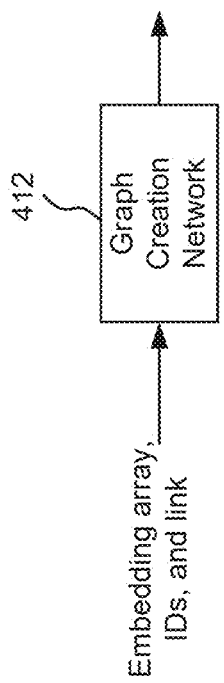

Based on the overall/flat embedding array, the graph generating module 306 generates a graph and associated subcomponents/sub-graphs 410, as depicted in detail along with FIG. 4B. The subcomponents of the graph may indicate relationship between words/contents in the preprocessed raw names. As depicted in FIG. 4B, the graph generating module 306 may use a graph creation network/network library 412 to generate the graph and the associated subcomponents based on the overall/flat embedding array, the links, and the IDs of the preprocessed raw names. The subcomponents of the graph may be formed with connected edges and nodes, based on closest cosine similarity. An example graph (dotted line area) and subcomponents of the graph with the connected edges and nodes surrounded by a circle are depicted in FIG. 4B.

Figure 4C:
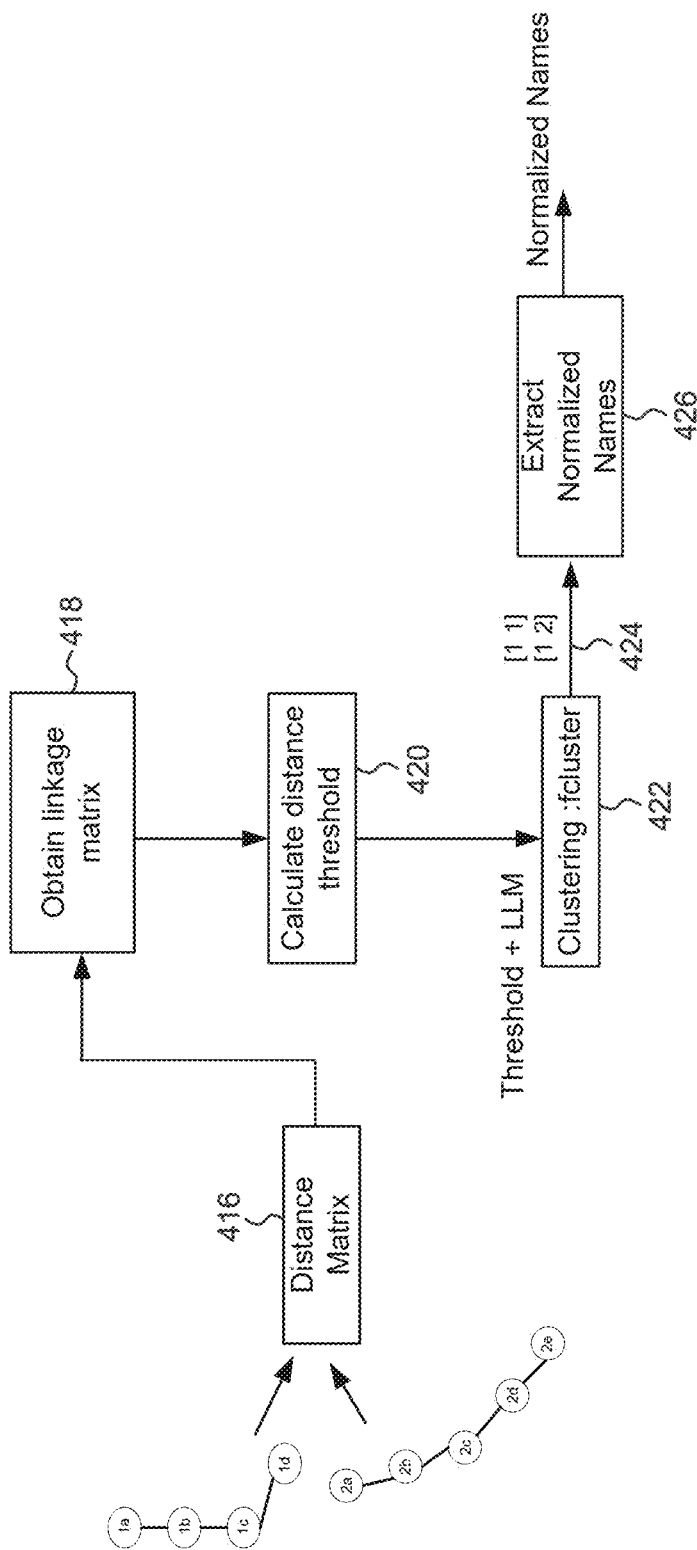

Based on the subcomponents of the graph, the clustering module 308 assigns the normalized names for the raw names, which is described in detail along with FIG. 4C. As depicted in FIG. 4C, the clustering module 308 computes a Euclidian/Cosine distance matrix 416 for the subcomponents of the graph. Based on the Euclidian/Cosine distance matrix 416, the clustering module 308 may use a hierarchical method to cluster the similar preprocessed raw names. For clustering the similar preprocessed raw names, the clustering module 308 may obtain a linkage matrix (LM) 418 from the Euclidian distance matrix using a centroid method and calculate a distance threshold 420. The clustering module 308 may evaluate the LM and the distance threshold using a clustering function 422 to generate a cluster dictionary 424. The cluster dictionary 424 may represent cluster numbers associated with the raw names. In an example, for the preprocessed raw names "ABC" and "ABC-1", the cluster number may be generated as {1, 1}, which indicates that "ABC" and "ABC-1" are belonging to a cluster-1. In another example, for the preprocessed raw names "DEF Data" and "DEF Logistics", the cluster number may be generated as {1, 2}, which indicates that "DEF data" belongs to the cluster-1 and "DEF Logistics" belongs to a cluster-2.

Upon generating the cluster dictionary 424, the clustering module 308 extracts the normalized names 426 for the preprocessed raw names using the cluster dictionary 424. For extracting the normalized names 426, the clustering module 308 derives cluster names for the cluster numbers represented by the cluster dictionary 424, using a common name method. The common name method may involve execution of a function "maximum (names)" for deriving the cluster names for the cluster numbers. The cluster names may refer to names which have highest count among other names. The count of the name may indicate a number of times the respective name has been repeated. Upon deriving the cluster names, the clustering module 308 accesses a final dictionary and extracts the normalized names associated with the cluster names from the final dictionary. The final dictionary may store a mapping of the cluster names and the associated normalized names. Also, the normalized names may be assigned to the preprocessed raw names along with the IDs associated with the raw names.

Referring back to FIG. 3, based on the extraction of the normalized names for the preprocessed raw names, the mapping module 310 creates and stores the global table 220 in the database 206. The global table 220 may be created by mapping the received raw names with the normalized names extracted for the respective preprocessed raw names. The global table/mapping of the raw names and normalized names is used to normalize the names received in the transactional data.

Figure 5:
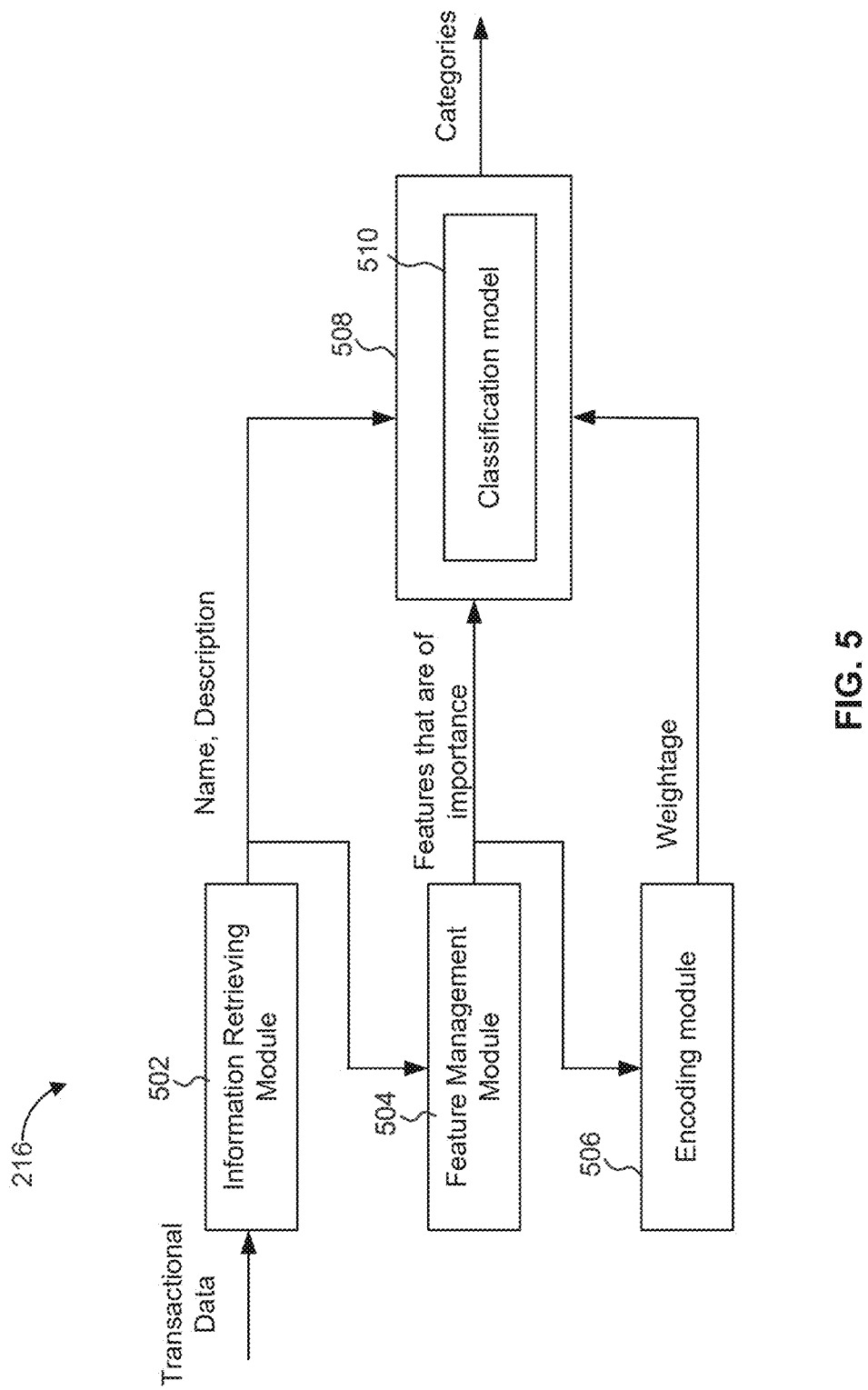
FIG. 5 is a block diagram that presents an example of a data classifier for classifying the transactional data into one or more categories in accordance with implementations of the present disclosure.

FIG. 5 is a block diagram that presents an example of the data classifier 216 for classifying the transactional data into the one or more categories in accordance with implementations of the present disclosure. The data classifier 216 includes an information retrieving module 502, a feature management module 504, an encoding module 506, and a classifying module 508.

The information retrieving module 502 extracts a description for each name from the transactional lines of the transactional data. The description may be extracted from a custom API table, which is a database table with the names and the associated description. The transactional data may be received for example in a form of Excel, list, Common Separated Values (CSV), and/or the like. In an example, the description extracted for a name "ABC" may include: Supplier Name: ABC Description: ABC provides consulting, assurance, tax, and transaction services that help solve our client's toughest challenges and build a better working world for all.

Upon extracting the description for each name, the feature management module 504 identifies words and frequency of the words in the description corresponding to each of features/dimensions that have been pre-defined and stored in the database 206 for the transactional data. In some examples, the features/dimensions may include names, invoice description, commodity description, material description, and/or the like. Also, the feature management module 504 performs a similarity search between the words with respect to each feature. Based on the similarity search, the information retrieving module 502 evaluates how the words spread across all the features/dimensions and how information is shared within each feature. In accordance with the evaluation, the feature management module 504 identifies the features that are of importance.

After identifying the features that are of importance, the encoding module 506 performs a context-based encoding on the features and the words derived from the description. For example, the encoding module 506 may assign weights to the features based on their identified importance and prioritize/sequence the features based on the assigned weights. The encoding module 506 may assign weights to the features using a weightage model (for example, foundation models/LLMs, AI models, ML models, and/or the like). The encoding module 506 may pass an input string to the weightage model and receive the weights to the features. The input string may be created by adding tags/special characters to the features and arranging the features in accordance with the order of importance. The tags/special characters may be considered as surrounding text by the weightage model for assigning the weights to the features. Also, the data classifier 216 may identify the words that are highly important and accordingly assign weights to the words. The words may include keywords, abbreviations, and/or the like. Based on the assigned weights to the features and keywords, the encoding module 506 generates a sequential order of description.

The classifying module 508 classifies the transactional data into the one or more categories in accordance with evaluation of outputs of the information retrieving module 502, the feature management module 504, and an encoding module 506. The classifying module 508 uses the classification model 510 to classify the transactional data into the one or more categories.

For classification of the transactional data, the classifying module 508 may provide feature encoding rules and the outputs of the modules 502-506 such as the description of each name, the features, the weights assigned to the features and keywords, and the sequential order of description to the classification model 510 for evaluation. In some examples, the feature encoding rules may include, but not limited to, rules for extraction of names from the description, the normalized names, rules for removal of wrong spelled/non-English words, characters, or the like, rules for removing words from the description that are less impact/more skewed towards the features, and so on. Based on the evaluation, the transactional data may be classified into the various categories and identifies the names for the normalization. In some implementations, the categories may include L1, L2, L3, and L4 categories. However, it is contemplated that implementations of the present disclosure may be realized with any appropriate number of categories. The categories may depend on the products and/or services being offered. In some examples, the L1, L2, L3, and L4 may include industrial operations, distribution, office supplies, and general office supplies, respectively. Therefore, with the proposed classification/categorization, the transactional data may be classified with high confidence and accuracy, while minimizing time consumption.

In an example herein, the name derived from the transactional data may indicate "ABC". The transactional lines/transactional data associated with the name "ABC" may be classified into L1, L2, and L3 categories. The categories L1, L2, and L3 indicate corporate professional services, legal, and legal-general, respectively.

In another example, as depicted in example table 1, the name derived from the transactional data may indicate "DEF". The transactional lines/transactional data associated with the name "ABC" may be classified into L1, L2, L3, and L4 categories, as depicted in example table 1.

TABLE 1

Name, Features, and Categories

| Name | Invoice | Description | Commodity Description | L1 | L2 | L3 | L4 |
|---|---|---|---|---|---|---|---|
| DEF | Purchase Off supplies | Paper | Office Supplies | Industrial Operation | Distribution | Office Supplies | General Office Supplies |

Figure 6:
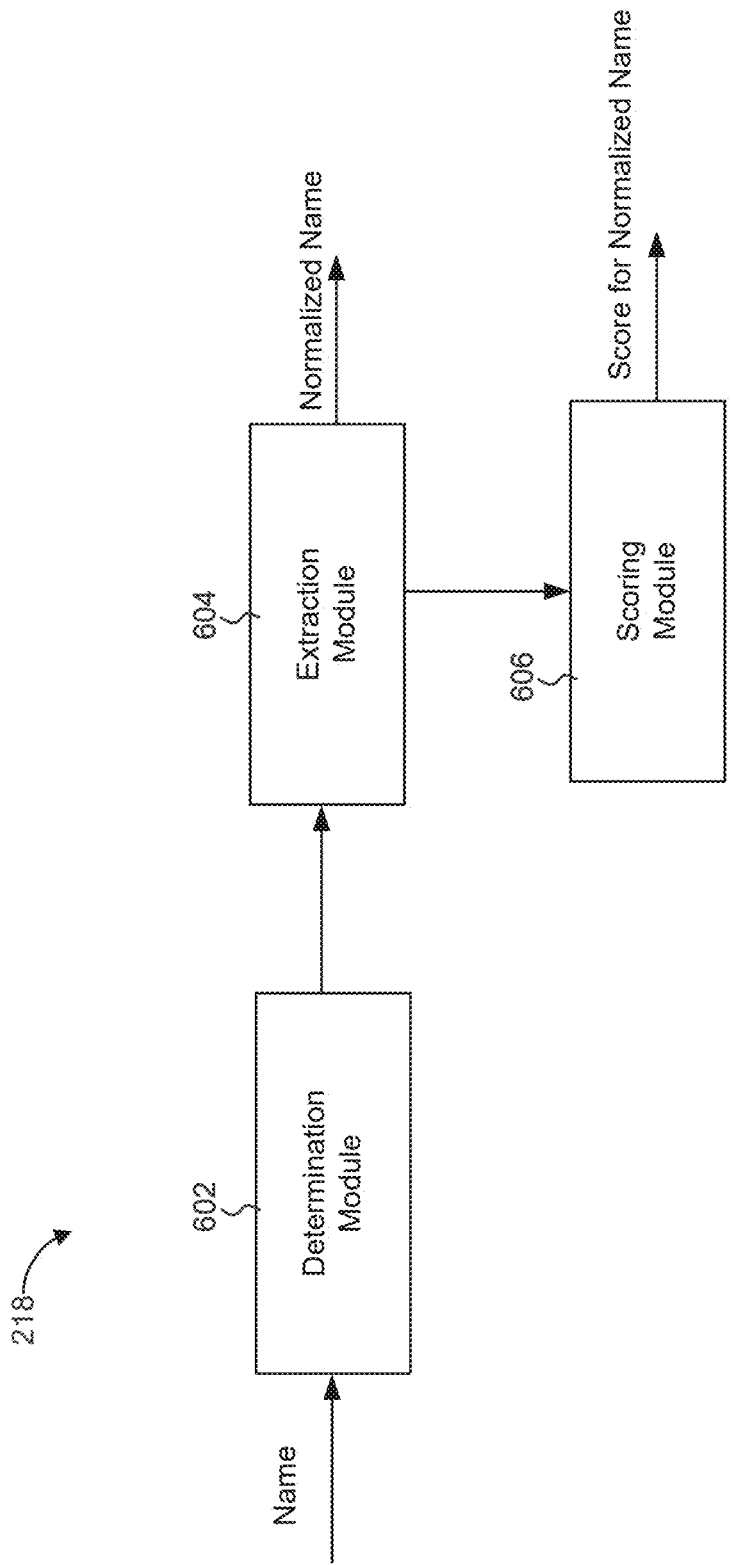
FIG. 6 is a block diagram that presents an example of a name normalizer for normalizing names derived from the transactional data in accordance with implementations of the present disclosure.

FIG. 6 is a block diagram that presents an example of the name normalizer 218 for normalizing the names received in the transactional data. The name normalizer 218 includes a determination module 602, an extraction module 604, and a score assigning module 606.

The determination module 602 receives the name(s) to be normalized from the data classifier 216. The name may be extracted by the data classifier 216 from the transactional data as described in detail in conjunction with FIGS. 2 and 5. The determination module 602 performs various types of determination to match the received name with one of the raw names present in the global table 220 (which is stored in the database 206).

The determination module 602 performs the type-1 determination (first determining) to determine whether the received name matches any of the raw names stored in the global table 220. If the received name matches any of the raw names, the determination module 602 identifies a result of the type-1 determination as a positive result. In response to identifying the positive result, the extraction module 604 extracts and assigns the normalized name from the global table 220 for the received name based on the matched raw name.

If the received name does not match any of the raw names, the determination module 602 identifies the result of the type-1 determination as a negative result. In response to identifying the negative result, the determination module 602 performs first preprocessing of the received name to generate a preprocessed name. The first preprocessing of the received name may include removing content found in a first list from the received name. The content found in the first list may include generic keywords, special characters, and/or the like as are often found in variants of corporate names. Non-limiting examples of content from a first list include "LLC," "LTD," "&," "Inc." "US" Korea" and the like.

After the first preprocessing of the received name, the determination module 602 performs the type-2 determination (second determining) to determine whether the preprocessed name matches any of the raw names of the global table 220. If the preprocessed name matches any of the raw names, the determination module 602 identifies a result of the type-2 determination as a positive result. In response to identifying the positive result, the extraction module 604 extracts and assigns the normalized name from the global table 220 for the preprocessed name based on the matched raw name.

If the preprocessed name does not match any of the raw names, the determination module 602 identifies the result of the type-2 determination as a negative result. In response to identifying the negative result, the determination module 602 submits the preprocessed name to the search engine 204 and receives search results from the search engine 204, such as Bing or Google. The search results include a predetermined number of top search results returned by the search engine 204 in response to the submission of the preprocessed name. The search results may include links and/or keywords and/or information about a company/organization corresponding to the received name. The determination module 602 identifies a searched name from the search results of the search engine 204. For example, the determination module 602 may extract a top k search results (for example, top four search results), which includes the links. The determination module 602 may process each of the links individually. The determination module 602 may process the links by '/' and '.' to gather all relevant keywords. Thereafter, the determination module 602 may apply a fuzzy-wuzzy logic (for example, with a threshold value of 90%) on the gathered relevant keywords and identify a keyword from the relevant keywords as the searched name. The keyword identified as the searched name may be the name, which closely matches with the preprocessed name.

Upon identifying the searched name, the determination module 602 performs the type-3 determination to determine whether the searched name matches any of the raw names of the global table 220. If the searched name matches any of the raw names, the determination module 602 identifies a result of the type-3 determination as a positive result. In response to identifying the positive result, the extraction module 604 extracts and assigns the normalized name from the global table for the searched name based on the matched raw name.

If the searched name does not match any of the raw names, the determination module 602 identifies the result of the type-3 determination as a negative result. In response to identifying the negative result, the determination module 602 performs second preprocessing on the search name. The second preprocessing includes identifying one or more links from the search results and removing the contents found in a second list from the one or more links. The links may include title, description, and/or the like. In some examples, for identifying the links, the determination module 602 may extract names and/or the links from the search results obtained from the search engine. If the determination module 602 fails to extract any links from the search results, the determination module 602 fetches the search results including the links from a link database. The link database may act as repository for storing the links for the searched names and/or the links for the raw names. For an example searched name "DEF mission organization", the links such as "https:// www.DEFmission.org/about"; "https://www.DEFmission-leadership.org/"; and https://DEFmissionleadership.com/ may be extracted.

After the second preprocessing, the determination module 602 generates a link name by cross referencing results of the second preprocessing with a prior history of search engine results. The prior history of search engine results may indicate the links derived previously for the searched names. In some examples, the determination module 602 may query the link database for the obtained links. If the obtained links are present in the link database, the determination module 602 may identify the raw name associated with the links as the link name.

After generating the link name, the determination module 602 performs the type-4 determination (fourth determining) to determine whether the link name matches any of the raw names of global table 220. If the link name matches any of the raw names, the determination module 602 identifies a result of the type-4 determination as a positive result. In response to identifying the positive result, the extraction module 604 extracts and assigns the normalized name from the global table for the searched name based on the matched raw name.

If the link name does not match any of the raw names, the determination module 602 identifies the result of the type-4 determination as a negative result. In response to identifying the negative result, the determination module 602 sends the received name for manual name normalization. For example, an admin or a subject matter expert may assign the normalized name for the received name.

Normalized names extracted for exemplary received names are depicted in example tables 2 and 3.

TABLE 2

Received Name and Normalized Name

| Received Name | Normalized Name |
|---|---|
| ABC PTE. LTD. | ABC Text Corporation |
| ABC | ABC Text Corporation |
| ABC SRL | ABC SRL Services |

TABLE 3

Received Name and Normalized Name

| Received Name | Normalized Name |
|---|---|
| DEF Country A | DEF |
| DEF LTD | DEF |
| DEF OUTSOURCING | DEF |

The score assigning module 606 flags the extracted normalized name for the received name with an accuracy score. The accuracy score represents an estimated accuracy/confidence of the extracted normalized name relative to the received name. For example, the accuracy score for the extracted normalized name resulting from the type-1 determination is higher than the accuracy score for the extracted normalized name resulting from the second determining. The accuracy score for the extracted normalized name resulting from the type-2 determination is higher than the accuracy score for the extracted normalized name resulting from the type-3 determination. Similarly, the accuracy score for the extracted normalized name resulting from the type-3 determination is higher than the accuracy score for the extracted normalized name resulting from the type-4 determination.

For example, accuracy scores such as 100%, 98%, 95%, and 90% may be provided to the normalized name extracted from the type-1, type-2, type-3, and type-4 determinations, respectively.

Figure 7:
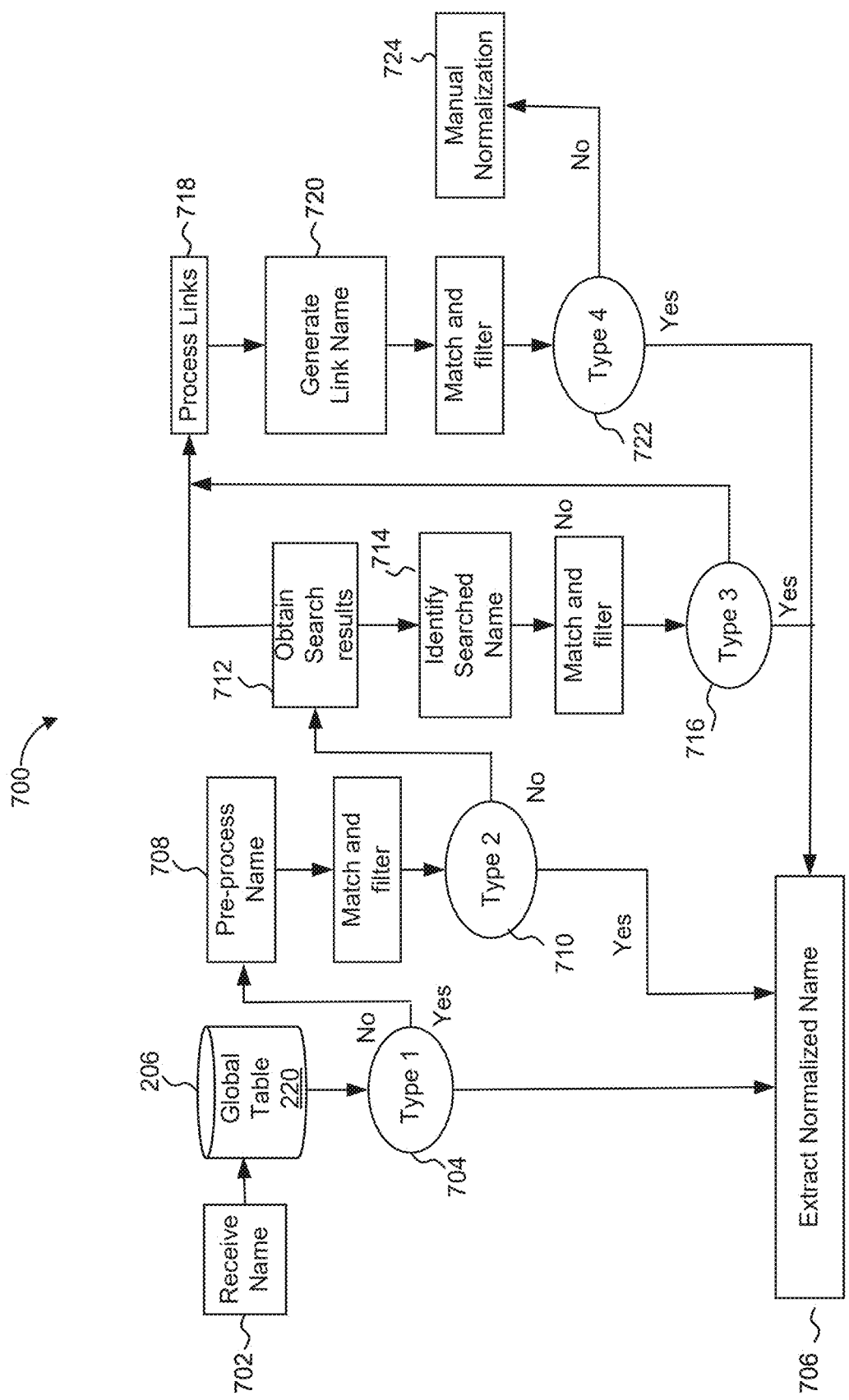
FIG. 7 is a flow diagram that presents an example method for normalizing the names in accordance with implementations of the present disclosure.

FIG. 7 depicts an example method 700 for normalizing the received name in accordance with implementations of the present disclosure. In some implementations, the method 700 may be executed within the transactional data management system 114 using the name normalizer 218 as described in relation to FIGS. 2 and 6.

According to implementations of the present disclosure, the name is normalized using the global table 220 stored in the database 206. The global table 220 includes a mapping of the raw names with the associated the normalized names, which is already described in detail in conjunction with FIGS. 3, and 4A-4C. Therefore, repeated description is omitted herein for sake of brevity.

The method 700 includes receiving (702) the name. In some examples, the name may be received from the data classifier 216. In some examples, the name normalizer 218 may receive the transactional data and identify the name to be normalized from the transactional data.

Upon the receiving (702) the name, the method 700 includes performing (704) the type-1 determination/direct lookup of the global table 220 (stored in the database 206) to determine whether the received name matches any of the raw names. If the received name matches with any of the raw names (i.e., in response to the positive result of the type-1 determination), the method 700 includes extracting (706) the normalized name associated with the matched raw name from the global table 220 and assigning the extracted normalized name to the received name.

If the received name does not match with any of the raw names (i.e., in response to the negative result of the type-1 determination), the method 700 includes preprocessing (708) (i.e., the first preprocessing) the raw name, which results in the preprocessed name. The preprocessing/first preprocessing of the raw name to generate the processed name is already described in detail in conjunction with FIG. 6, therefore repeated description is omitted herein. After obtaining the preprocessed name, the method 700 performs the type-2 determination (710) using a match and filter technique to match the preprocessed name with any of the raw names in the global table 220. If the preprocessed name matches with any of the raw names in the global table 220 (i.e., in response to the positive result of the type-2 determination), the method 700 includes performing the step 706 to extract the normalized name associated with the matched raw name from the global table 220 and assign the normalized name to the preprocessed name.

If the preprocessed name does not match with any of the raw names (i.e., in response to the negative result of the type-2 determination), the method 700 includes submitting (712) the preprocessed name to the search engine 204 and receiving the search results from the search engine 204. The method 700 includes identifying (714) the searched name from the received search results. Upon identifying the searched name, the method 700 includes performing the type-3 determination (716) using the match and filter technique to determine whether the searched name matches any of the raw names in the global table 220. If the searched name matches any of the raw names, (i.e., in response to the positive result of the type-3 determination), the method 700 includes performing the step 706 to extract the normalized name associated with the matched raw name from the global table 220 and assign the normalized name to the searched name.

If the searched name does not match with any of the raw names (i.e., in response to the negative result of the type-3 determination), the method 700 includes preprocessing (718) (i.e., second preprocessing) the links derived from the search results to remove content from the links found in the second list. After preprocessing of the links, the method 700 includes generating (720) the link name by cross referencing results of the preprocessing of the links with the prior history of the search results.

Upon generating the link name, the method 700 includes performing (722) the type-4 determination using the match and filter technique to determine whether the link name matches any of the raw names in the global table 220. If the link name matches any of the raw names, (i.e., in response to the positive result of the type-4 determination), the method 700 includes performing the step 706 to extract the normalized name associated with the matched raw name from the global table 220 and assign the normalized name to the link name.

If the link name does not match with any of the raw names (i.e., in response to the negative result of the type-4 determination), the method 700 includes initiating (724) manual name normalization for normalizing the received name.

Therefore, the proposed hierarchical levels of determination for name normalization guarantees accurate normalization of the receive name while minimizing time and cost. In addition, the proposed normalization reduces overhead on the search engine 204 to query and/or resolve the names against the database 206.

The above methodology solves several technical problems over the prior art. First, the accuracy of name normalization is over 90% compared to about 10% of the prior art. Second, the probability that the methodology will identify the normalized name without needed to rely upon a third-party search engine is much higher than the prior art. As such, the methodology is faster and consumes less overall resources as the methodology does not need to rely upon the time for search queries. Also, with the lower reliance on search queries means a lower probability of running into search limits of the search engine, thus allowing more names to be processed.

Figure 8:
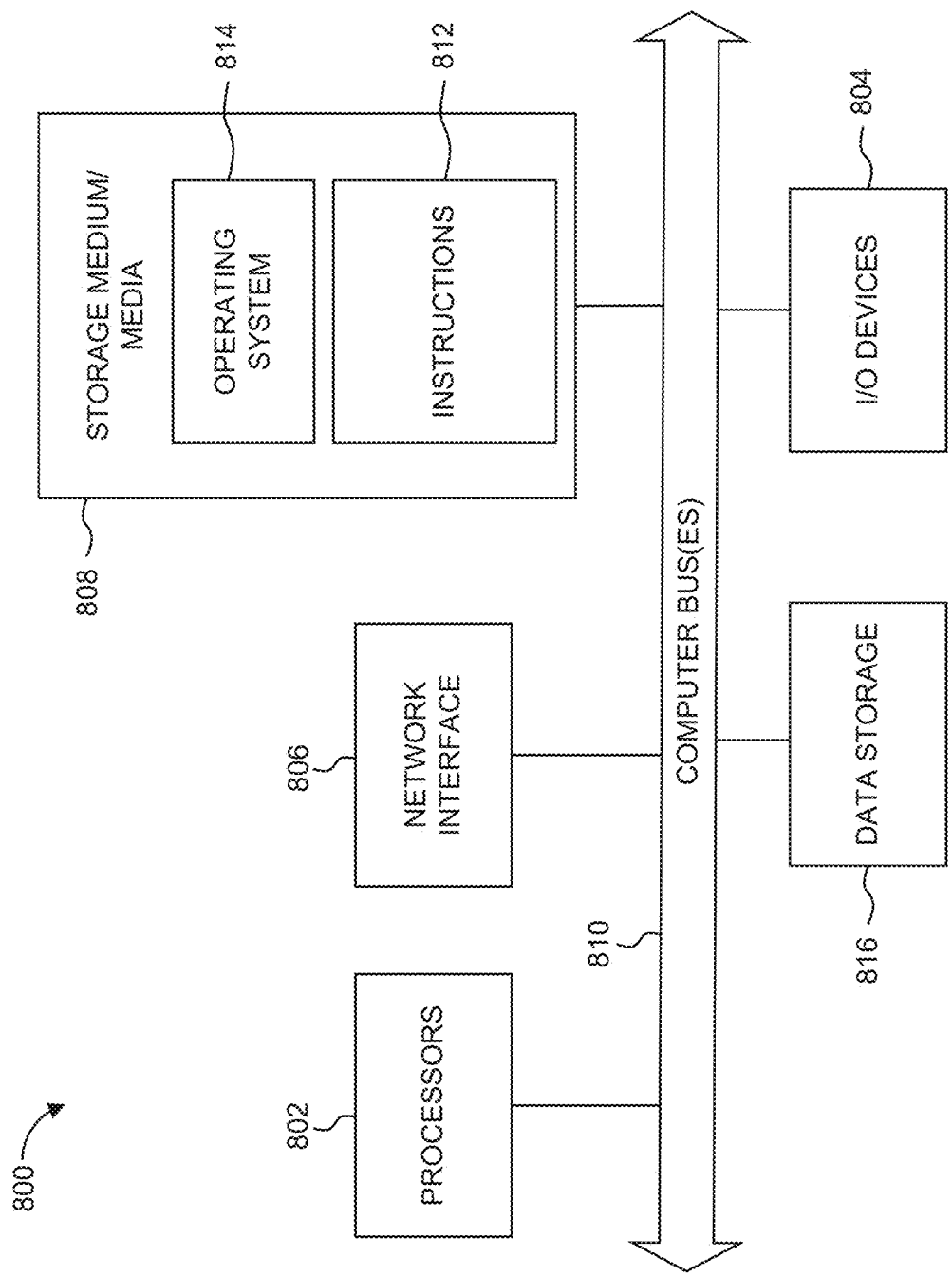
FIG. 8 illustrates a computer system that may be used to implement the transactional data management system in accordance with implementations of the present disclosure.

FIG. 8 illustrates a computer system 800 that may be used to implement the transactional data management system 114. More particularly, computing machines such as desktops, laptops, smartphones, tablets, and wearables which may be used to categorization and normalization of the transaction data and that may have the structure of the computer system 800. The computer system 800 may include additional components not shown and that some of the process components described may be removed and/or modified. In another example, a computer system 800 may be deployed on external-cloud platforms such as cloud, internal corporate cloud computing clusters, organizational computing resources, and/or the like.

The computer system 800 includes processor(s) 802, such as a central processing unit, ASIC or another type of processing circuit, input/output devices 804, such as a display, mouse keyboard, etc., a network interface 806, such as a Local Area Network (LAN), a wireless 802.11x LAN, a 3G or 4G mobile WAN or a WiMax WAN, and a computer-readable medium 808. Each of these components may be operatively coupled to a bus 810. The computer-readable medium 808 may be any suitable medium that participates in providing instructions programmed to cooperate with the processor(s) 802 to perform operations of the transactional data management (including categorizing the transactional data and normalizing the names). For example, the computer-readable medium 808 may be non-transitory or non-volatile medium, such as a magnetic disk or solid-state non-volatile memory or volatile medium such as RAM. The instructions or modules stored on the computer-readable medium 808 may include machine-readable instructions 812 executed by the processor(s) 802 that cause the processor(s) 802 to perform the methods and functions of the transactional data management system 114.

The transactional data management system 114 may be implemented as software stored on a non-transitory processor-readable medium and executed by the processors 802. For example, the computer-readable medium 808 may store an operating system 814, such as MAC OS, MS WINDOWS, UNIX, or LINUX, and code for the transactional data management system 114. The operating system 814 may be multi-user, multiprocessing, multitasking, multi-threading, real-time, and the like. For example, during runtime, the operating system 814 is running and the code for the transactional data management system 114 is executed by the processor(s) 802.

The computer system 800 may include a data storage 816, which may include non-volatile data storage. The data storage 816 stores any data used or generated by the transactional data management system 114.

The network interface 806 connects the computer system 800 to internal systems for example, via a LAN. Also, the network interface 806 may connect the computer system 800 to the Internet. For example, the computer system 800 may connect to web browsers and other external applications and systems via the network interface 806.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term computing system encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network (LAN) and a wide area network (WAN), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer implemented programmed method for normalizing names included in a data associated with interactions facilitated between a computing device and a data management system, the programmed method comprising:
   receiving, by one or more processors of the data management system, from one or more data sources, raw names and metadata for the raw names;
   generating, by the one or more processors, a mapping of the raw names and corresponding normalized names in a database by accessing the raw data, wherein generating the mapping comprises:
   obtaining the raw names;
   preprocessing the raw names to generate preprocessed raw names;
   generating a graph and associated subcomponents for the preprocessed raw names, wherein the subcomponents of the graph indicate a relationship between words in the raw names, wherein generating the graph and the associated subcomponents comprises:
submitting the preprocessed raw names to the search engine;
identifying, from search results of the search engine, links for the preprocessed names;
generating an embedding array for the links by generating embeddings for each of the links;
computing an overall embedding for the links by summing of all the embeddings in the embedding array along a predefined axis; and
generating the graph and the associated subcomponents based on the overall embedding computed for the links; and
performing a clustering process on the graph and the associated subcomponents to derive the normalized names for the raw names;
receiving the data associated with the interactions from the computing device, wherein the data associated with the interactions includes the names, wherein the names include names of users, description about the interactions, and description about the users indicating types of one or more commodities;
classifying, using a classification model, the received data associated with the interactions into one or more categories;
extracting, from the classification, each of the names from the received data for normalizing; and
normalizing each of the extracted names using the mapping, wherein the normalizing a name comprises:
first determining, by the one or more processors, whether the received name matches any of the raw names of the database;
in response to a negative result of the first determining:
first preprocessing the received name to remove content found in a first list, resulting in a preprocessed name, wherein the negative result of the first determining indicates that the received name does not match with any of the raw names of the database;
second determining, by the one or more processors, whether the preprocessed name matches any of the raw names of the database;
in response to a negative result of the second determining:
submitting the preprocessed name to a search engine, wherein the negative result of the second determination indicates that the preprocessed name does not match with any of the raw names of the database;
identifying, from search results of the search engine, a searched name;
third determining, by the one or more processors, whether the searched name matches any of the raw names of the database; and
extracting, by the one or more processors, in response to positive results of the first determining, the second determining, or the third determining, one of the normalized names from the database based on the matches of the first determining, the second determining, or the third determining.

2. The computer implemented programmed method of claim 1, the programmed method further comprising:
in response to a negative result of the third determining:
second preprocessing at least some links from the search results to remove content from the links found in a second list;
cross referencing results of the second preprocessing with a prior history of search engine results to generate a link name;
fourth determining whether the link name matches any of the raw names of the database; and
extracting, in response to a positive result of the fourth determining, one of the normalized names from the database based on a match identified in the fourth determining.

3. The computer implemented programmed method of claim 2, the programmed method further comprising:
sending, in response to a negative result of the fourth determining, the received name for manual name normalization.

4. The computer implemented programmed method of claim 2, wherein the search results comprise a predetermined number of top search results returned by the search engine returned in response to the submitting.

5. The computer implemented programmed method of claim 1, wherein the identifying comprises identifying keywords and/or information about a company corresponding to the received name.

6. The computer implemented programmed method of claim 1, further comprising flagging the extracted normalized name with an accuracy score, the accuracy score representing an estimated accuracy of the extracted normalized name relative to the received name.

7. The computer implemented programmed method of claim 6, wherein:
the accuracy score for an extracted normalized name resulting from the first determining is higher than the accuracy score for an extracted normalized name resulting from the second determining; and
the accuracy score for an extracted normalized name resulting from the second determining is higher than the accuracy score for an extracted normalized name resulting from the third determining.

8. The computer-implemented programmed method of claim 1, wherein classifying the received data associated with the interactions into the one or more categories comprises:
extracting a description for each of the names in the received data;
identifying words and frequency of words in the description with respect to each of a plurality of features pre-defined for the received data;
performing a context-based encoding on the features and the words derived from the description to assign weights to each of the plurality of features and the words; and
classifying the received data into the one or more categories and extracting each name from the received data for normalizing by evaluating the weights of each of the plurality of features and the words and a set of feature encoding rules using the classification model.

9. The computer-implemented programmed method of claim 8, wherein performing the context-based encoding on the features of the description comprises:
performing a similarity search on the words with respect to each feature for determining distribution of words across each of the features;
determining, from the plurality of features, a set of features that are of importance for the received data;
creating a tag for each feature in the set of features;
arranging each feature in the set of features in accordance with an order of importance; and assigning a weight to each feature in the set of features based on evaluation of the tag and arrangement of each feature.

10. The computer-implemented programmed method of claim 8, wherein classifying the received data into the one or more categories further comprises utilizing the one or more categories to support automation of processes associated with interactions related to the one or more commodities of an organization.

11. The computer-implemented programmed method of claim 8, wherein extracting the description for each of the names in the received data, further comprises extracting the description from a custom application programming interface (API) table in the database with the names and the associated description.

12. The computer-implemented programmed method of claim 8, wherein assigning the weight to each feature in the set of features based further comprises, providing input string to a weightage model to generate weights to the features, wherein the input string is generated, based on the arranged features, by adding special characters to the features.

13. The computer-implemented programmed method of claim 1, wherein performing the clustering process comprises:
   computing a Euclidian distance matrix for the subcomponents of the graph;
   deriving one or more clusters of similar preprocessed names based on evaluation of the Euclidian distance matrix using a hierarchical method;
   generating a cluster dictionary for the one or more clusters of similar preprocessed names, wherein the cluster dictionary includes a cluster number for each cluster;
   deriving a cluster name for the cluster number; and
   extracting the normalized name for each raw name from a final dictionary based on the derived cluster name, wherein the final dictionary includes a mapping of cluster names and associated normalized names.

14. A data management system for managing data which is generated through interactions with one or more data sources, comprising:
   a processor; and
   a memory storing instructions programmed to cooperate with the processor to perform operations to normalize a received name, the operations comprising:
      receiving, by an interface tool of the data management system, raw data from the one or more data sources, raw data including raw names and metadata for the raw names;
      generating a mapping of the raw names and corresponding normalized names in the database by accessing the raw data, wherein generating the mapping comprises:
         obtaining the raw names;
         preprocessing the raw names to generate preprocessed raw names;
         generating a graph and associated subcomponents for the preprocessed raw names, wherein the subcomponents of the graph indicate a relationship between words in the raw names,
         submitting the preprocessed raw names to the search engine;
         identifying, from search results of the search engine, links for the preprocessed names;
         generating an embedding array for the links by generating embeddings for each of the links;
         computing an overall embedding for the links by summing of all the embeddings in the embedding array along a predefined axis; and
         generating the graph and the associated subcomponents based on the overall embedding computed for the links; and
      performing a clustering process on the graph and the associated subcomponents to derive the normalized names for the raw names;
      receiving data associated with the interactions from the one or more data sources, wherein the data associated with the interactions includes names of the users, description about the interactions, and description about the users indicating types of the one or more commodities;
      classifying, using a classification model, the received data associated with the interactions into one or more categories;
      extracting, from the classification, each of the names from the received data for normalizing; and
      normalizing each of the extracted names using the mapping, wherein the normalizing a name comprises:
         first determining whether the received name matches any of the raw names of the database;
         in response to a negative result of the first determining:
            first preprocessing the received name to remove content found in a first list, resulting in a preprocessed name;
            second determining whether the preprocessed name matches any of the raw names of the database;
            in response to a negative result of the second determining:
               submitting the preprocessed name to a search engine;
               identifying, from search results of the search engine, a searched name;
               third determining whether the searched name matches any of the raw names of the database; and
               extracting, in response to positive results of the first determining, the second determining, or the third determining, one of the normalized names from the database based on any of the matches.

15. The system of claim 14, the operations further comprising:
   in response to a negative result of the third determining:
      second preprocessing at least some links from the search results to remove content from the links found in a second list;
      cross referencing results of the second preprocessing with a prior history of search engine results to generate a link name;
      fourth determining whether the link name matches any of the raw names of the database; and
      extracting, in response to a positive result of the fourth determining, one of the normalized names from the database based on a match identified in the fourth determining.

16. The system of claim 15, the operations further comprising:
   sending, in response to a negative result of the fourth determining, the received name for manual name normalization.

17. A non-transitory computer readable media storing instructions programmed to cooperate with a processor to perform operations to normalize names of data received from a computing device by a data management system, the operations comprising:
- receiving, by an interface tool of the data management system, raw data from the one or more data sources, raw data including raw names and metadata for the raw names;
- generating a mapping of the raw names and corresponding normalized names in the database by accessing the raw data, wherein generating the mapping comprises:
  - obtaining the raw names;
  - preprocessing the raw names to generate preprocessed raw names;
  - generating a graph and associated subcomponents for the preprocessed raw names, wherein the subcomponents of the graph indicate a relationship between words in the raw names, wherein generating the graph and the associated subcomponents comprises:
    - submitting the preprocessed raw names to the search engine;
    - identifying, from search results of the search engine, links for the preprocessed names;
    - generating an embedding array for the links by generating embeddings for each of the links;
    - computing an overall embedding for the links by summing of all the embeddings in the embedding array along a predefined axis; and
    - generating the graph and the associated subcomponents based on the overall embedding computed for the links; and
  - performing a clustering process on the graph and the associated subcomponents to derive the normalized names for the raw names;
- receiving data associated with the interactions from the one or more data sources, wherein the data associated with the interactions includes names of the users, description about the interactions, and description about the users indicating types of the one or more commodities;
- classifying, using a classification model, the received data associated with the interactions into one or more categories;
- extracting, from the classification, each of the names from the received data for normalizing; and
- normalizing each of the extracted names using the mapping, wherein the normalizing a name comprises:
- first determining whether the received name matches any of the raw names of the database;
- in response to a negative result of the first determining:
- first preprocessing the received name to remove content found in a first list, resulting in a preprocessed name;
- second determining whether the preprocessed name matches any of the raw names of the database;
- in response to a negative result of the second determining:
- submitting the preprocessed name to a search engine;
- identifying, from search results of the search engine, a searched name;
- third determining whether the searched name matches any of the raw names of the database; and
- extracting, in response to positive results of the first determining, the second determining, or the third determining, one of the normalized names from the database based on any of the matches.

18. The non-transitory computer readable media of claim 17, the operations further comprising:
- in response to a negative result of the third determining:
- second preprocessing at least some links from the search results to remove content from the links found in a second list;
- cross referencing results of the second preprocessing with a prior history of search engine results to generate a link name;
- fourth determining whether the link name matches any of the raw names of the database; and
- extracting, in response to a positive result of the fourth determining, one of the normalized names from the database based on a match identified in the fourth determining.

* * * * *